US010540898B2

(12) United States Patent
Kim et al.

(10) Patent No.: US 10,540,898 B2
(45) Date of Patent: Jan. 21, 2020

(54) DECISION SUPPORT SYSTEM FOR AIR MISSIONCOMMANDER DYNAMIC MISSION RE-PLANNING

(71) Applicant: General Electric Company, Schenectady, NY (US)

(72) Inventors: So Young Kim, San Ramon, CA (US); Aaron Williams, Middleville, MI (US); Mark Snyder, Glendale, AZ (US); Christopher Scott Sensing, Caledonia, MI (US); Samuel Levulis, Lubbock, TX (US); Jeffrey Robert Winters, Grand Rapids, MI (US); Sundar Murugappan, San Ramon, CA (US); Courtney Albers, Grand Haven, MI (US); Jennifer Ruth Cooper, San Ramon, CA (US); Michael Eric Figard, Rockford, MI (US); Alexander Kaber Carroll, Lopez Island, WA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 208 days.

(21) Appl. No.: 15/656,297

(22) Filed: Jul. 21, 2017

(65) Prior Publication Data
US 2019/0027047 A1 Jan. 24, 2019

(51) Int. Cl.
*G06F 3/01* (2006.01)
*G09B 9/00* (2006.01)
(Continued)

(52) U.S. Cl.
CPC ......... *G08G 5/0026* (2013.01); *G05D 1/0061* (2013.01); *G06F 3/011* (2013.01);
(Continued)

(58) Field of Classification Search
USPC ........................................... 701/120
See application file for complete search history.

(56) References Cited

U.S. PATENT DOCUMENTS 5,229,538 A * 7/1993 McGlynn ............... B64D 7/00
102/206
6,696,980 B1 * 2/2004 Langner ................ G01C 23/00
340/971
(Continued)

OTHER PUBLICATIONS

Leavitt, Charles A. "Real-Time In-Flight Planning", Proceedings of the IEEE 1996 National Aerospace and Electronics Conference NAECON, vol. 1, 1996, Dayton, OH, (pp. 83-89, 7 total pages).
(Continued)

*Primary Examiner* — Tyler D Paige
(74) *Attorney, Agent, or Firm* — Buckley, Maschoff & Talwalkar LLC

(57) ABSTRACT

A dynamic human machine interface system includes a mission commander application (MCA) unit including a control processor, the MCA active on one vehicle of a plurality of mission member vehicles, the MCA unit in communication with a data store, the control processor accessing executable instructions that cause the control processor to direct operations of components of the MCA unit, an alternate scenario evaluation unit accessing at least one of mission parameter records and flight member data records in the data store to recalculate mission parameters, a dynamic video interface unit to render the recalculated mission parameters on a mission control dashboard (MCD), the MCD presented to the mission commander on a display unit of the one vehicle, the MCD including a plurality of display pane areas selectable by a user interaction with an interactive interface, and each display area configurable by the user interaction to change content of the display pane.

17 Claims, 1 Drawing Sheet

(51) Int. Cl.
*G08G 5/00* (2006.01)
*G05D 1/00* (2006.01)
*G09B 9/048* (2006.01)

(52) U.S. Cl.
CPC ........... *G08G 5/0043* (2013.01); *G09B 9/003* (2013.01); *G09B 9/048* (2013.01)

(56) References Cited

U.S. PATENT DOCUMENTS

| | | | | |
|---|---|---|---|---|
| 6,697,008 | B1* | 2/2004 | Sternowski | G01S 5/0284 |
| | | | | 342/14 |
| 6,778,906 | B1* | 8/2004 | Hennings | G05D 1/0061 |
| | | | | 340/961 |
| 7,043,344 | B2 | 5/2006 | Kotzev et al. | |
| 7,236,861 | B2* | 6/2007 | Paradis | F41H 13/00 |
| | | | | 701/120 |
| 7,412,361 | B2 | 8/2008 | Rachlin | |
| 7,451,023 | B2 | 11/2008 | Appleby et al. | |
| 7,737,883 | B2* | 6/2010 | Dark | G01S 7/021 |
| | | | | 342/13 |
| 7,765,038 | B2* | 7/2010 | Appleby | F41H 13/00 |
| | | | | 180/167 |
| 7,893,866 | B2* | 2/2011 | Dark | G01S 7/021 |
| | | | | 342/13 |
| 8,600,587 | B1 | 12/2013 | Sean et al. | |
| 9,046,892 | B2 | 6/2015 | Jang et al. | |
| 9,064,222 | B2* | 6/2015 | Saad | G06Q 10/0631 |
| 9,488,441 | B2* | 11/2016 | Eriksson | F41G 9/00 |
| 2005/0000472 | A1 | 1/2005 | Duggan et al. | |
| 2005/0004723 | A1 | 1/2005 | Duggan et al. | |
| 2006/0164261 | A1* | 7/2006 | Stiffler | G01C 23/00 |
| | | | | 340/945 |
| 2006/0184291 | A1* | 8/2006 | Paradis | F41H 13/00 |
| | | | | 701/23 |
| 2007/0046670 | A1* | 3/2007 | Hedrick | G01C 23/00 |
| | | | | 345/440 |
| 2008/0065576 | A1* | 3/2008 | Friedlander | G06N 7/08 |
| | | | | 706/47 |
| 2008/0177688 | A1* | 7/2008 | Friedlander | G06N 7/08 |
| | | | | 706/46 |
| 2008/0215192 | A1* | 9/2008 | Hardman | G01C 23/00 |
| | | | | 701/3 |
| 2008/0297396 | A1* | 12/2008 | Dark | G01S 7/021 |
| | | | | 342/14 |
| 2009/0112377 | A1* | 4/2009 | Schalla | B64D 11/0015 |
| | | | | 701/3 |
| 2009/0198392 | A1* | 8/2009 | Eicke | G01C 23/005 |
| | | | | 701/3 |
| 2009/0326893 | A1* | 12/2009 | Neely | G08G 5/0034 |
| | | | | 703/8 |
| 2013/0214941 | A1* | 8/2013 | Rogers | G08G 5/0021 |
| | | | | 340/971 |
| 2014/0257760 | A1* | 9/2014 | Nixon | G06Q 10/06 |
| | | | | 703/1 |
| 2015/0253144 | A1* | 9/2015 | Rau | G01C 21/3415 |
| | | | | 705/348 |
| 2015/0339930 | A1* | 11/2015 | McCann | G08G 5/0039 |
| | | | | 701/528 |
| 2016/0313961 | A1* | 10/2016 | Jayaraj | G06F 3/04883 |
| 2016/0343261 | A1* | 11/2016 | Branthomme | G01C 23/00 |
| 2018/0227860 | A1* | 8/2018 | Hudson | H04W 84/005 |
| 2019/0027047 | A1* | 1/2019 | Kim | G08G 5/0026 |

OTHER PUBLICATIONS

Taylor, Robert M., "From Safety Net to Augmented Cognition: Using Flexible Autonomy Levels for On-Line Cognitive Assistance and Automation", Research Gate, Feb. 2003, (pp. 27-1 to 27-21, total 21 pages).

Extended European Search Report and Opinion issued in connection with corresponding EP Application No. 18183197.5 dated Dec. 4, 2018.

European Office Action dated Sep. 18, 2019 which was issued in connection with EP Patent Application No. 18183197.5 which was filed on Jul. 12, 2018.

* cited by examiner

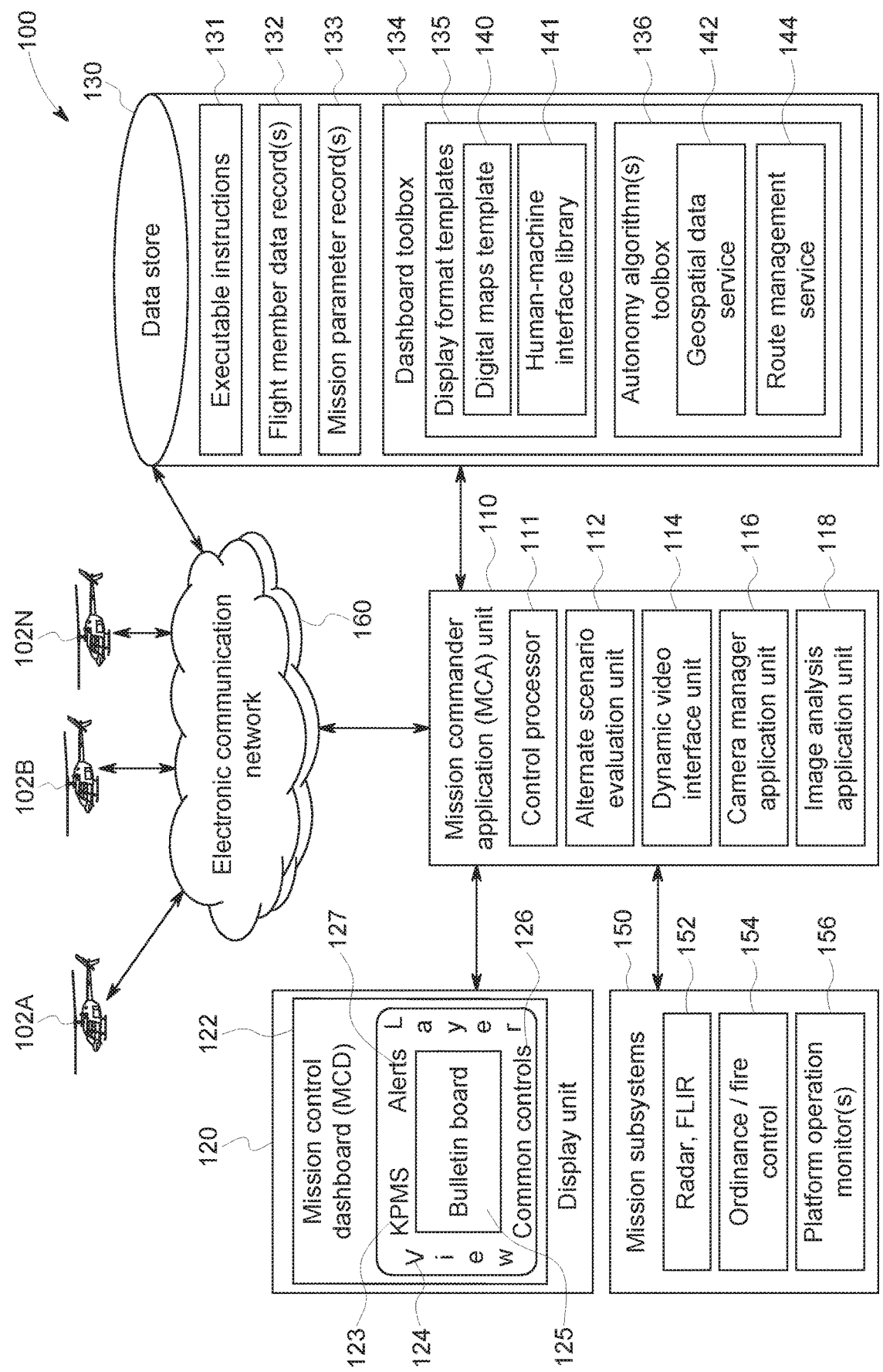

DECISION SUPPORT SYSTEM FOR AIR MISSIONCOMMANDER DYNAMIC MISSION RE-PLANNING

BACKGROUND

With the rapid development in mission system capabilities and intelligence information available in the aircraft cockpit, the aircrew's workload has rapidly increased as these new capabilities are added into the vehicle. Adding additional new capabilities to conventional control and display architecture results in a sub-optimal display of information, difficulty accessing information, and information overload for the pilot to process while flying the aircraft and performing the mission.

For example, conventional systems available to the air mission commander (AMC) of a flight of rotary wing aircraft severely limits the AMC's combat effectiveness. These conventional systems cause an undesirably high level of mental workload and less-than-ideal situation awareness for the AMC.

The dearth of information that is readily available to an AMC greatly increases their mental workload. In today's operations the AMC must contact other aircraft in the flight via radio to monitor their fuel, fuel burn rates, and stores. Moreover, the AMC calculates their craft's own fuel values to crosscheck the three-minute average burn rate generated by the flight management system. Specifically, the AMC will take a fuel reading at each of their mission profiles (i.e., specific points in the mission, such as waypoints or altitudes), and then take another reading at a predetermined interval (e.g., twenty minutes later). By subtracting the initial fuel reading from that taken later, the AMC can estimate their craft's hourly burn rate. This value is then compared to the value produced by the flight management system. This task is done while the AMC is piloting the aircraft.

On occasion the AMC might need to make changes to the flight plan, which forces real-time recalculations of fuel burn projections for the vehicles in the flight. For example, the AMC could get updated intelligence information that there are hostile forces located in the primary ingress route, requiring him/her to decide whether they have the fuel required to avoid the hostile by taking an alternate route. Similarly, the ground commander of the unit being picked up in an air assault mission could request a change in landing zone. These types of rapidly changing situations require the AMC to make additional decisions about mission-capability under significant time pressure, with potentially serious consequences—again still while piloting the aircraft.

Another undesirable characteristic of conventional systems is the less-than optimal situation awareness that the AMC has for certain elements of the tactical situation. First, much of the information that is important to an AMC is pre-briefed rather than real-time. The AMC conducts photograph reconnaissance of the primary and alternate landing zones prior to departure, but these areas can change by the time the flight actually reaches its destination. The AMC is pre-briefed with the latest intelligence prior to mission departure, but this information can quickly become outdated on a dynamic battlefield. Even if the AMC is given real-time intelligence information (e.g., base command calls on the radio to warn about a potential hostile unit), it can be difficult for the AMC to assimilate this information into their mental understanding of the situation, as it requires them to mark the location on a paper map and mentally integrate the flight's own position into this situation picture.

Another factor of conventional systems that contributes to the lower than optimal situation awareness experienced by the AMC is the absence of information about the specific locations of the other vehicles in the flight. Conventionally, each helicopter in the squadron is responsible for maintaining an appropriate distance from the helicopter in front of them. The lead helicopter sets the speed and altitude and each helicopter sets their position relative to the vehicle in front of them. Conventional systems fail to provide information about the specific locations of other vehicles, forcing each crewmember to help monitor the nearby airspace to ensure the vehicles are maintaining the necessary separation. This type of process requires a tremendous amount of crew coordination and is certainly less than ideal.

BRIEF DESCRIPTION OF THE DRAWINGS

FIG. 1 depicts a mission command system in accordance with embodiments.

DETAILED DESCRIPTION

Embodying systems and methods provide a mission command graphical interface system that is a simplified, adaptable, and extensible human-machine interface (HMI) and application framework to increase the operational effectiveness of the AMC in an ever-changing environment. Embodying systems support the work of the AMC by (1) providing key performance indices of the mission in general (e.g., mission status, time on target, team asset status, and others); and (2) providing key performance indicators (KPIs) of each team member aircraft (e.g., fuel remaining against mission completion fuel requirements, weapons stores status, flight range, time on target, expected arrival at target, time to interim waypoints, and other KPIs).

FIG. 1 depicts mission command system (MCS) 100 in accordance with embodiments. MCS 100 can include mission commander application (MCA) unit 110 which is in direct communication with data store 130 and display unit 120. In some implementations, MCA unit 110 can communicate with the data store across electronic communication network 160. Embodying mission command systems receive flight member data records 132 from flight member aircraft 102A, 102B, . . . , 102N across electronic communication channel 160. The flight member data records can include data on the AMC's aircraft.

If an unexpected situation develops limiting the mission capability for one (or more) of the flight members, alternate scenario evaluation unit 112 can analyze flight member data received from the incapacitated member(s) to recalculate mission parameters records 133 (e.g., fuel, stores, cargo capacity, etc.). Flight member data can be applied by MCA unit 110 to obtain mission team member status updates. These status updates can be rendered on mission control dashboard (MCD) 122 in about real-time by dynamic video interface unit 114. These recalculated mission parameters can be available to the AMC on MCD 122.

Presenting updated mission parameters to the AMC allows that information to be used by the AMC in determining whether the remaining mission team can still be collectively viable to complete the mission. In accordance with embodiments, it provides multiple options of alternate mission scenarios that can be provided according to the revised mission parameters.

Dynamic changes to the flight plan are cognitively taxing on the AMC because the changes necessitate recalculation of fuel burn estimates, and also require the AMC to determine their impact on the flight time to destination. Changing waypoints or landing zones can demand either a change in airspeed(s) for the remaining leg(s) of the flight, or a change in the time-on-target. Embodying systems can display this information in an ergonomic form to provide the AMC these factors when making decisions that will change the flight plan.

In accordance with embodiments, mission commander system 100 is a framework that can support tasks associated with commanding an air squadron while executing a mission. The mission commander system provides the AMC with information in an efficient manner for strategic management of the flight, mission assets, and mission goal. In accordance with embodiments, mission command system 100 can decrease the human data processing demands placed on the AMC by providing analysis, data, and scenarios in MCD 122 to support increased automation and autonomy. For purposes of discussion, U.S. Army Blackhawk and Apache helicopter missions are presented. However, embodying systems and methods are not so limited and can be implemented in other vehicles (e.g., military or non-military, fixed wing, ground-based, navel, etc.). Embodying systems and methods support a mission commander (e.g., AMC) in the goal of achieving a mission objective for a team of vehicle assets acting in concert as mission members.

An embodying mission commander application can be enabled by an Integrated Modular Avionics (IMA) real-time computer network airborne systems, an Open Display System Architecture (ODSA), and supporting tools. This ecosystem provides the ability to add and modify the capabilities of the mission system by the system integrator.

The MCD 122 can include an interactive user interface, where the user can change the display item and/or displayed content via a pointing device, touch screen, keypad/keyboard, and/or voice command. The MCD includes multiple display pane areas (e.g., key performance monitor section (KPMS) 123, view layer 124, bulletin board 125, common control area 126, and alert section 127). Each of these display panes can be pre-defined for easy access to types of information. The AMC can reconfigure the position and/or content of each of these panes.

The panes can provide consistent/quick access to information such as views, layers, alerts, key performance, and maps. The panes are user-configurable so that views can be defined by an application and displayed in one or more of the display areas. Dashboard toolbox 134 can include a robust set of display format templates 135 which can be added to a section and linked to an input data stream on the IMA. The MCA unit can provide the AMC with the ability to customize the display of information and specify a human machine interface (HMI) using both the templates 135 and autonomy algorithm toolbox 136.

In accordance with embodiments, display format templates 135 can include digital map templates 140 to be shared between various displays. The digital maps can offer various viewing modes, such as 2D top down, and/or 3D in multiple camera modes and details. The MCD can layer imagery, terrain, and features using algorithm toolbox 136 to render custom interactive layers on the base map as part of the HMI through an interface provided by MCA unit 110.

HMI library 141 can include a set of HMI components that MCA unit 110 can use to present dynamic data and accept user inputs. The HMI library can offer base capabilities (e.g., text, symbol-rendering, etc.), along with widgets to manage user interaction, the display of common constructs (e.g., tabular lists, menus, tabular organization, etc.), and tools to configure HMIs and also to create IMA compatible display applications.

Autonomy algorithm toolbox 136 can include a collection of software services that implement commonly needed functions in a mission management IMA environment. The toolbox can include geospatial data service 142 that can obtain information via the IMA by preparing terrain queries (e.g., line-of-sight, height above terrain, sensor visibility, target recognition, etc.). Route management service 143 can include algorithms to provide route management, fuel consumption/monitoring, ETA predictions, trajectory generation, track fusion, guidance, etc. In accordance with embodiments, these software services can be customized by defining them through open system configuration tools and capabilities to be added to the IMA and displayed on MCD 122 via the MCA unit 110. Information can be obtained from mission subsystems 150. The information can include radar, forward looking infrared 152, ordnance and fire control status 154, and platform operation monitor status 156 (e.g., fuel consumption, altitude, location, engine operation, pressure, etc.).

In accordance with embodiments, MCD 122 can include multiple panes—a large area display unit (LAD), a middle display unit, and a text communication display unit (TCDU). In accordance with implementations, the LAD can display a map and information related to vehicle and mission management. The middle display can be configured by the AMC to show images from camera manager application 116 or detailed information about any of the vehicles in the flight obtained from the flight members and/or stored in flight member data record(s) 132. The TCDU can present text-based communication and intelligence information.

In accordance with embodiments, maps can be displayed in a top-down map view that provides the AMC with a picture of the surrounding tactical situation. This dynamic map display replaces the static paper maps that are conventionally prepared by the AMC prior to flight, and provides the AMC with information that is updated in real time. The position of waypoints, flight paths, enemy and friendly units, restricted operating zones, and named areas of interest can be available and updated (continuously, periodically, or at predetermined intervals). The display of the flight path can include a projection of a zone (e.g., an outlined area) representing the flight's projected optimal position that needs to be maintained to reach the mission landing zone on time. Deviation of the actual position from the zone can provide to the AMC an immediate indication as to whether the AMC must speed up or slow down the flight to reach the objective area on time.

The AMC has a tremendous amount of control over the map, allowing adjustment of the information presentation. There can be a number of overlays that can be toggled to the foreground of the display pane by user selection. These overlays can include weather and terrain information, threat rings, flight paths of each vehicle, named areas of interest, and restricted operating zones. The toggle functionality for many of these overlays allows the AMC to declutter the map at times when certain sources of information are not critical. The AMC can also adjust the range of the map to provide the spatial fidelity required for the current situation. This map adjustment can be performed by dynamic action of the AMC to incrementally zoom in or out, or by accessing five default ranges.

The map's orientation can be set to north-up or track-up, reducing mental rotation requirements from the AMC. The position of the AMC's helicopter can be set to either the center or the bottom of the map display area. Setting the position to centered provides the AMC with information about the surrounding area in all four cardinal directions. Setting the position to display bottom maximizes the presentation of information in the upcoming airspace.

The large area display can display a mission pane, which provides the AMC with quick access to critical fuel, stores, and navigation information from platform operation monitors 156 and/or flight member data records 132. High-level status information as to whether the AMC is capable of completing the current mission as planned can be presented at the top of this pane. If the mission cannot be completed (either due to insufficient fuel or stores, or because the objective cannot be reached on time) a display status of the current mission can go from "capable" to "incapable." This allows the AMC to monitor the overall status of a mission at a glance.

If the AMC wants more detailed information about the lower-level variables that make up the higher-level fuel, stores, and time-on-target information they can expand the appropriate tab. Selecting a fuel/stores tab on MCD 122 can depict a list of each vehicle in the flight. For each vehicle, the AMC has information about current and reserve fuel, burn rate, range, and the number of rounds of any weapon system or countermeasure the flight member vehicle has on board.

A time-on-target tab can be selected by the AMC to access critical navigation information, along with information about whether the flight is ahead of or behind schedule. For example, the AMC can view the distance to the next waypoint, and be provided with information regarding speed, direction, altitude, and other flight parameters to arrive at the waypoint on time. In some implementations, the display can also provide information regarding upcoming changes to these parameters to reach the next, and other, subsequent waypoints. This ability to depict flight parameters provides the AMC with continual situation awareness of the flight parameters that the pilot flying should be aiming for.

The time-on-target tab display can also depict for the AMC the planned time of arrival for each waypoint, as well as the estimated time of arrival and deviation for the flight's objective. The display can include a projected deviation (plus or minus) so that the AMC can attempt to reduce the deviation by instructing adjustments to the flight's airspeed A vertical situation display (VSD) is positioned underneath the compass rose of the map to provide the AMC with additional situation awareness about the position of vehicles in the surrounding airspace. From the VSD, the AMC can discern the altitudes of other vehicles, and be provided with information about upcoming terrain that may pose a threat to the flight. The VSD also can display a predictive component, which projects the altitude over which vehicles must fly to avoid upcoming terrain. This functionality can reduce the number of controlled flights into terrain that are a leading cause of military helicopter crashes. Also, the VSD information can reduce the requirement for the AMC and other crewmembers to devote substantial visual attention to the surrounding airspace to monitor the positions of other vehicles.

In accordance with embodiments, at the center of MCD 122 the AMC can view detailed information "cards" about an entity such as a team vehicle, enemy unit, or landing zone. In some implementations, camera manager application unit 116 can be accessed from this pane. For example, team vehicle card can depict relevant information about that flight vehicle's fuel and stores, and also provide the AMC with information about its speed, range, altitude, and heading. The AMC can view in this pane any additional details about system failures if they occur.

Camera manager application unit 116 can capture aerial photographs that are taken from either an onboard or unmanned autonomous vehicle-mounted camera. The AMC can use MCD 122 to control the camera manager for pan and zoom, along with select previously-captured photographs represented as thumbnails. Once photographs are captured, they can be sent to image analysis application unit 118 for analysis. When this analysis is complete, the location of any identified entities can be presented on the MCD, and a new icon generated indicating the entities' position on the map.

The TCDU can present to the AMC text-based intelligence information and communications. The AMC can be notified of a new message or intelligence report via a notification section in the LAD. When the AMC selects a message in the TCDU, there can be an option to acknowledge (which sends a notification to the message sender), or send a response. Acknowledging or responding to a message removes the notification for that message; thus, the AMC always has quick status information as to the number of messages that have not been addressed. In some implementations, the notification section can be located at the top left of the LAD so that the AMC would only be required to make a short eye movement to check for new messages, allowing them to direct more visual attention to the surrounding airspace.

In accordance with some embodiments, a computer program application stored in non-volatile memory or computer-readable medium (e.g., register memory, processor cache, RAM, ROM, hard drive, flash memory, CD ROM, magnetic media, etc.) may include code or executable instructions that when executed may instruct and/or cause a controller or processor to perform the functions and process of MCA unit 110 and MCD 122, as disclosed above.

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

We claim:

1. A dynamic human machine interface system, the system comprising:
   a mission commander application unit including a control processor, the mission commander application active on one vehicle of a plurality of mission member vehicles;
   the mission commander application unit in communication with a data store;
   the control processor configured to access executable instructions in the data store, wherein the executable instructions cause the control processor to direct operations of components of the mission commander application unit;

an alternate scenario evaluation unit configured to access at least one of mission parameter records and flight member data records in the data store, the alternate scenario evaluation unit configured to recalculate mission parameters based on the accessed mission parameter and accessed flight member data records, the accessed mission parameter records including information obtained from a radar subsystem;

the mission parameter records including one or more key performance indicators of mission status, time on target, and team asset status;

the flight member data records including one or more key performance indicators of team member aircraft fuel requirement to mission completion, weapons stores status, flight range, arrival time at target, and time to interim waypoint;

a dynamic video interface unit configured to render the recalculated mission parameters on a mission control dashboard, the mission control dashboard presented to the mission commander on a display unit of the one vehicle;

the recalculated mission parameters including one or more of waypoint change, landing zone change, flight leg airspeed change, and time-on-target change;

the mission control dashboard including a plurality of display pane areas selectable by a user interaction with an interactive interface; and each display area configurable by the user interaction to change content of the display pane, the user interaction accessing at least one of a digital map template, a toolbox of interactive map layers, and a library of human-machine interface components that create display applications compatible with an airborne integrated modular avionics real-time computer network system.

2. The system of claim 1, including the dynamic video interface unit configured to present multiple alternate mission scenarios on the mission control dashboard, the multiple alternate mission scenarios each calculated by the alternate scenario evaluation unit.

3. The system of claim 2, including the multiple alternate mission scenarios based on at least one of revised mission parameters and mission team member status updates received by the mission commander application unit.

4. The system of claim 1, including a dashboard toolbox having a plurality of display format templates used to configure data displayed on the mission control dashboard based on the user interaction selection.

5. The system of claim 1, including a dashboard toolbox having a plurality of human machine interface library elements that configure the dynamic human machine interface based on the user interaction selection.

6. The system of claim 1, including an autonomy algorithm toolbox having a collection of software services configured to implement at least one of geospatial data services and route management services.

7. The system of claim 6, the software services configured to access data provided by mission subsystems to implement the at least one of geospatial data services and route management services.

8. The system of claim 1, including a camera manager application unit configured to capture images from at least one of an onboard camera unit and an unmanned autonomous vehicle camera.

9. The system of claim 8, the camera manager application unit configured to be controlled by the user interaction selection.

10. The system of claim 8, including an image analysis unit configured to analyze images and provide images and identification of image content for display on the mission control dashboard.

11. The system of claim 1, the mission control dashboard including a pane for display of text-based communication.

12. The system of claim 1, the mission control dashboard including a pane configured to present images relating to a status of the plurality of mission member vehicles.

13. The system of claim 1, the mission control dashboard including one or more of the plurality of display panes each having an overlay of views, the overlay of views configured to be toggled to the foreground of the display pane by user selection.

14. The system of claim 1, including in the mission control dashboard a mission panel selectable by user interaction, the mission panel configured to provide information obtained from at least one of platform operation monitors and flight member data records.

15. The system of claim 1, including in the mission control dashboard a time-on-target tab selectable by user interaction, the time-on-target tab configured to present navigation information.

16. The system of claim 1, including in the mission control dashboard a vertical situation display configured to provide information on the position of the plurality of mission member vehicles.

17. The system of claim 1, the accessed mission parameter records further including information on ordinance and fire control status, fuel consumption, altitude, location, engine operation, and engine pressure.

* * * * *